(12) United States Patent
Case

(10) Patent No.: US 6,463,405 B1
(45) Date of Patent: *Oct. 8, 2002

(54) AUDIOPHILE ENCODING OF DIGITAL AUDIO DATA USING 2-BIT POLARITY/MAGNITUDE INDICATOR AND 8-BIT SCALE FACTOR FOR EACH SUBBAND

(76) Inventor: Eliot M. Case, 2876 S. Joslin Ct., Denver, CO (US) 80227

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,790

(22) Filed: Dec. 20, 1996

(51) Int. Cl.$^7$ ................................................ G10L 19/02
(52) U.S. Cl. ...................................... 704/206; 704/258
(58) Field of Search ................................. 704/208, 278, 704/233, 500, 501, 503, 504, 206, 258; 381/62, 119, 118

(56) References Cited

U.S. PATENT DOCUMENTS

| | | |
|---|---|---|
| 4,061,875 A | 12/1977 | Freifeld et al. |
| 4,099,035 A | 7/1978 | Yanick |
| 4,118,604 A | 10/1978 | Yanick |
| 4,156,116 A | 5/1979 | Yanick |
| 4,509,186 A | 4/1985 | Omura et al. |
| 4,536,886 A | 8/1985 | Papamichalis et al. |
| 4,703,480 A | 10/1987 | Westall et al. |
| 4,813,076 A | 3/1989 | Miller |
| 4,820,059 A | 4/1989 | Miller et al. |
| 4,969,192 A | 11/1990 | Chen et al. |
| 4,975,958 A | 12/1990 | Hanada et al. |
| 5,033,090 A | 7/1991 | Weinrich |

(List continued on next page.)

FOREIGN PATENT DOCUMENTS

| | | |
|---|---|---|
| EP | 0446037 A2 | 9/1991 |
| EP | 0446037 A3 | 9/1991 |
| EP | 0607989 A3 | 7/1994 |
| EP | 0607989 A2 | 7/1994 |
| WO | WO91/06945 | 5/1991 |
| WO | WO94/25959 | 11/1994 |

OTHER PUBLICATIONS

ISO/IEC "Standard 11172–3", pp. 30–31 Apr. 15, 1996.*
Brandenburg and Stoll, ISO–MPEG Audio: A Generic Standard for Coding of High Quality Digital Audio, 92nd Audio Engineering Society, Jul. 15, 1994.*

(List continued on next page.)

*Primary Examiner*—Tālivaldis Ivars Šmits
(74) *Attorney, Agent, or Firm*—Townsend and Townsend and Crew LLP

(57) ABSTRACT

A method, system and product are provided for loss-less encoding of a digital signal representing an audible sound. The method includes dividing the digital signal into a plurality of frames, dividing each of the plurality of frames into a plurality of subbands, and assigning each of the plurality of subbands an indicator selected from the group consisting of positive, zero, and negative, wherein the indicator selected is based on a polarity and a magnitude of the subband. The method further includes assigning each of the plurality of subbands one of a plurality of scale factors, wherein each scale factor represents a sound level range of at most two decibels, and generating a digital word for each of the plurality of frames, each digital word having a scale factor section including the scale factors for the plurality of subbands in the frame, and a sample data section including the indicators for the plurality of subbands in the frame. The system includes a sampler, a filter and control logic for performing the method. The product includes a storage medium having computer readable programmed instructions for performing the method.

9 Claims, 4 Drawing Sheets

U.S. PATENT DOCUMENTS

| | | |
|---|---|---|
| 5,040,217 A | 8/1991 | Brandenburg et al. |
| 5,140,638 A | 8/1992 | Moulsley et al. |
| 5,199,076 A | 3/1993 | Taniguchi et al. |
| 5,201,006 A | 4/1993 | Weinrich |
| 5,226,085 A | 7/1993 | Di Francesco |
| 5,227,788 A | 7/1993 | Johnston et al. |
| 5,233,660 A | 8/1993 | Chen |
| 5,235,669 A | 8/1993 | Ordentlich et al. |
| 5,255,343 A | 10/1993 | Su |
| 5,285,498 A | 2/1994 | Johnston |
| 5,293,449 A | 3/1994 | Tzeng |
| 5,293,633 A | 3/1994 | Robbins |
| 5,301,019 A | 4/1994 | Citta |
| 5,301,205 A | 4/1994 | Tsutsui et al |
| 5,329,613 A | 7/1994 | Brase et al. |
| 5,341,457 A | 8/1994 | Hall, II et al. |
| 5,353,375 A | 10/1994 | Goto et al. |
| 5,404,377 A | 4/1995 | Moses |
| 5,408,580 A * | 4/1995 | Stautner et al. ............. 704/205 |
| 5,467,139 A | 11/1995 | Lankford |
| 5,473,631 A | 12/1995 | Moses |
| 5,488,665 A | 1/1996 | Johnston et al. |
| 5,500,673 A | 3/1996 | Zhou |
| 5,509,017 A | 4/1996 | Brandenburg et al. |
| 5,511,093 A | 4/1996 | Edler et al. |
| 5,512,939 A | 4/1996 | Zhou |
| 5,515,395 A | 5/1996 | Tsutsui |
| 5,633,981 A | 5/1997 | Davis |

OTHER PUBLICATIONS

Holtz, The Evolution of Lossless Data Compression Techniques, Proc. WESCON 93 Sep. 30, 1993.*

Deller et al "Discrete–time processing of speech signals" 1987, Ptentice–Hall p. 416.*

Barnwell et al "Speech Coding" 1996, Wiley, p. 49–50.*

New Digital Hearing Aids Perk Up Investor' Ears, St. Louis Post–Dispatch, Sep. 27, 1995.

Jean–Pierre Renard, Ph.D., B.B.A., High Fidelity Audio Coding, pp. 87–97.

* cited by examiner

AUDIOPHILE ENCODING OF DIGITAL AUDIO DATA USING 2-BIT POLARITY/MAGNITUDE INDICATOR AND 8-BIT SCALE FACTOR FOR EACH SUBBAND

CROSS-REFERENCE TO RELATED APPLICATIONS

This application is related to U.S. patent application Ser. No.08/771,462 entitled "Method, System And Product For Modifying The Dynamic Range Of Encoded Audio Signals"; U.S. patent application Ser. No. 08/771,792 entitled "Method, System And Product For Modifying Transmission And Playback Of Encoded Audio Data"; U.S. patent application Ser. No. 08/771,512 entitled "Method, System And Product For Harmonic Enhancement Of Encoded Audio Signals"; U.S. patent application Ser. No. 08/771,911 entitled "Method, System And Product For Multiband Compression Of Encoded Audio Signals"; U.S. patent application Ser. No. 08/769,911 entitled "Method, System And Product For Mixing Of Encoded Audio Signals"; U.S. patent application Ser. No. 08/769,732 entitled "Method, System And Product For Using Encoded Audio Signals In A Speech Recognition System"; U.S. patent application Ser. No. 08/772,591 entitled "Method, System And Product For Synthesizing Sound Using Encoded Audio Signals"; U.S. patent application Ser. No. 08/769,731 entitled "Method, System And Product For Concatenation Of Sound And Voice Files Using Encoded Audio Data"; and U.S. patent application Ser. No. 08/771,469 entitled "Graphic Interface System And Product For Editing Encoded Audio Data", all of which were filed on the same date and assigned to the same assignee as the present application.

TECHNICAL FIELD

This invention relates to a method, system and product for audiophile quality subband encoding of digital data representing audible signals.

BACKGROUND ART

To more efficiently transmit digital audio data on low bandwidth data networks, or to store larger amounts of digital audio data in a small data space, various data compression or encoding systems and techniques have been developed. Many such encoded audio systems use as a main element in data reduction the concept of not transmitting, or otherwise not storing, portions of the audio that might not be perceived by an end user. As a result, such systems are referred to as perceptually encoded or "lossy" audio systems, since a portion of the data is eliminated (i.e., "lost") based on the expected perception of the end user.

However, some end users can perceive this data loss. Perceptually encoded audio systems are therefore not considered "audiophile" quality. In that regard, for an end user that can detect this data loss; the intermittent nature of data being transmitted in some audio frames and not transmitted in other frames causes an odd type of distortion.

Moreover, processing of lossy perceptually encoded audio data is limited. For example, if the data at a specific frequency needs to be boosted in level, but that data has been eliminated by the encoding process, such data processing cannot be accomplished The dynamic range of most perceptually encoded audio systems is in the 120 dB range, quantized in 2 dB steps. While this represents an improvement over conventional compact discs, which have a dynamic range slightly wider than 90 dB, compact discs are closer to audiophile quality than perceptually encoded audio systems.

Compact discs, however, suffer from the added limitation that the distortion of audio at low levels is quite high. In that regard, low level signals on a standard 16 bit resolution compact disc, such as 70 dB below maximum, have distortion on the order of 20%. By comparison, normal compact disc distortion is approximately 0.001% at maximum level. However, maximum level cannot be used efficiently on a compact disc. Because of the nature of sound, only peaks occupy the top 10 dB maximum region, and peaks need not be low in distortion. As a result, most audiophiles desire an audio system with more than 16 bits of resolution to avoid such low level distortion.

Thus, there exists a need for an improved method, system and product for encoding a digital signal representing an audible sound. Such a method, system and product would encode digital audio signals in a fashion, such that the signals are provided with an audiophile quality. Moreover, such a method, system and product would also encode digital audio signals with a very large dynamic range.

SUMMARY OF THE INVENTION

Accordingly, it is the principle object of the present invention to provide an improved system and method for encoding a digital signal representing an audible sound.

According to the present invention, then, a method is provided for encoding a digital signal representing an audible sound. The method comprises dividing the digital signal into a plurality of frames, dividing each of the plurality of frames into a plurality of subbands, and assigning each of the plurality of subbands an indicator selected from the group consisting of positive, zero, and negative, wherein the indicator selected is based on a polarity and a magnitude of the subband. The method further comprises assigning each of the plurality of subbands one of a plurality of scale factor steps, wherein each scale factor step represents a sound level range of at most two decibels, and generating a digital word for each of the plurality of frames, each digital word having a scale factor section including the scale factor steps for the plurality of subbands in the frame, and a sample data section including the indicators for the plurality of subbands in the frame.

A system for encoding a digital signal representing an audible sound is also provided. The system of the present invention comprises a sampler for dividing the digital signal into a plurality of frames, and a filter for dividing each of the plurality of frames into a plurality of subbands. The system further comprises control logic operative to assign each of the plurality of subbands an indicator selected from the group consisting of positive, zero, and negative, wherein the indicator selected is based on a polarity and a magnitude of the subband, assign each of the plurality of subbands one of a plurality of scale factor steps, wherein each scale factor step represents a sound level range of at most two decibels, and generate a digital word for each of the plurality of frames, each digital word having a scale factor section including the scale factor steps for the plurality of subbands in the frame, and a sample data section including the indicators for the plurality of subbands in the frame.

A product for encoding a digital signal representing an audible sound is also provided The product comprises a storage medium having computer readable programmed instructions recorded thereon. The instructions are operative to assign each of a plurality of subbands in each of a plurality of frames of the digital audio signal an indicator selected from the group consisting of positive, zero, and negative, wherein the indicator selected is based on a polarity and a magnitude of the subband, assign each of the plurality of subbands one of a plurality of scale factor steps, wherein each scale factor step represents a sound level range of at most two decibels, and generate a digital word for each of the plurality of frames, each digital word having a scale factor section including the scale factor steps for the plurality of subbands in the frame; and a sample data section including the indicators for the plurality of subbands in the frame.

Still further an alternative method for encoding a digital signal representing an audible sound is also provided. The method comprises dividing the digital signal into a plurality of frames, dividing each of the plurality of frames into a plurality of subbands, and assigning each of the plurality of subbands an indicator representing frequency and phase information The method further comprises assigning each of the plurality of subbands one of a plurality of scale factor steps, wherein each scale factor step represents a sound level range of at most two decibels, and generating a digital word for each of the plurality of frames, each digital word having a scale factor section including the scale factor steps for the plurality of subbands in the frame, and a sample data section including the indicators for the plurality of subbands in the frame.

These and other objects, features and advantages will be readily apparent upon consideration of the following detailed description in conjunction with the accompanying drawings.

BEST MODE FOR CARRYING OUT THE INVENTION

In general, the present invention is designed to encode digital audio signals in a fashion, such that the signals are provided with an audiophile quality. Moreover, the present invention also encodes such audio signals in a configuration with a very large dynamic range. The compact data format of the present invention is easily viewable and editable, thereby facilitating data manipulations and/or later lossy data compression such as in well known perceptual encoding systems.

In that regard, the present invention can be used to optimize perceptually encoded audio formats to provide audiophile resolution. In so doing, the present invention provides an easily decipherable, open data format facilitating development of processing/editing tools. The data will be compressed in an audiophile manner using much less data space than equivalent linear data files, and will permit digital signal processing (e.g., mixing and frequency equalization of signals) to be performed in a much faster fashion.

As previously mentioned, however, the present invention provides audiophile quality encoding of digital audio Thus, while they resolve digital audio signals in a similar fashion to perceptually encoded audio systems and may be used with such systems, the present invention does not provide perceptually encoded audio Instead, the present invention is more properly referred to as "component audio", since all portions or components of the digital audio signal which could conceivably be audible are retained.

Figure 1:
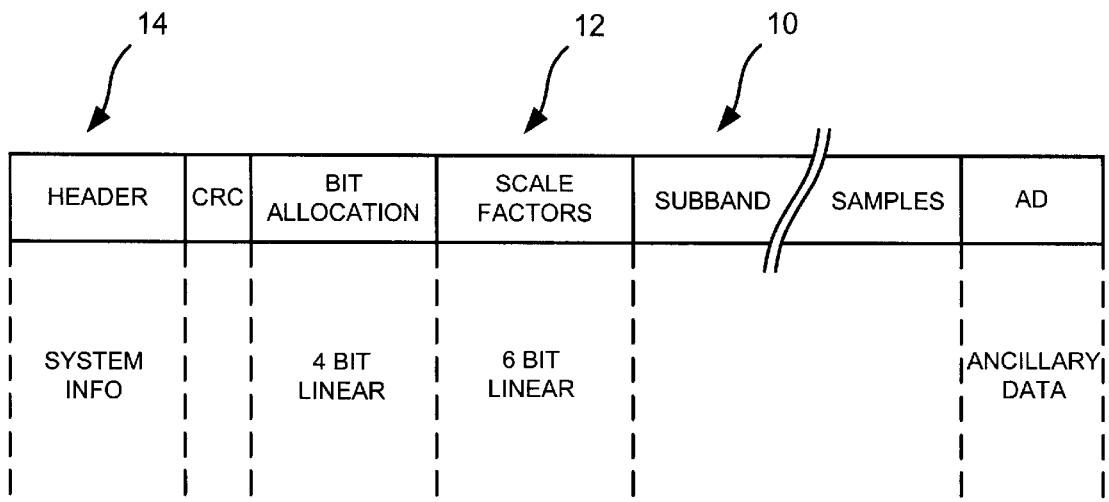
FIG. 1 is an exemplary encoding format for an audio frame according to prior art perceptually encoded audio systems.

Referring now to FIGS. 1–7, the preferred embodiment of the present invention will now be described in greater detail. FIG. 1 depicts an exemplary encoding format for an audio frame according to prior art perceptually encoded audio systems, such as the various levels of the Motion Pictures Expert Group (MPEG), Musicam, or others. Examples of such systems are described in detail in a paper by K. Brandenburg et al. entitled "ISO-MPEG-1 Audio: A Generic Standard For Coding Of High-Quality Digital Audio", Audio Engineering Society, 92nd Convention, Vienna, Austria, March 1992, which is hereby incorporated by reference.

In that regard, it should be noted that the present invention can be applied to subband data encoded as either time versus amplitude (low bit resolution audio bands as in MPEG audio layers 1 or 2, and Musicam) or as frequency elements representing frequency, phase and amplitude data (resulting from Fourier transforms or inverse modified discrete cosine spectral analysis as in MPEG audio layer 3, Dolby AC3 and similar means of spectral analysis). It should further be noted that the present invention is suitable for use with any system using mono, stereo or multichannel sound including Dolby AC3, 5.1 and 7.1 channel systems.

As seen in FIG. 1, such perceptually encoded digital audio includes multiple frequency subband data samples (10), as well as 6 bit dynamic scale factors (12) representing an available dynamic range of approximately 120 decibels (dB) given a resolution of 2 dB per scale factor. The bandwidth of each subband is ⅓ octave. Such perceptually encoded digital audio still further includes a header (14) having information pertaining to sync words and other system information such as data formats, audio frame sample rate, channels, etc.

To greatly increase the available dynamic range and/or the resolution thereof, the present invention adds one or more bits to the dynamic scale factors (12) of the prior art. For example, by using 8 bit dynamic scale factors, the dynamic range is doubled to 256 dB and given an improved 1 dB per scale factor resolution. Alternatively, such 8 bit dynamic scale factors with a given resolution of 0.5 dB per scale factor will provide a dynamic range of 128 dB. In either case, the accuracy of storage is increased or maintained well beyond what is needed for dynamic range, while the side-effects of low resolution dynamic scaling are reduced. As will be described in greater detail below, this added data is only sent once with each audio frame and thus does not add a significant amount of data to the transmission. In that regard, it is preferred that each scale factor step have a sound level range of at most 2 dB (e.g., 1.5 dB, 1 dB, 0.5 dB). That is, a lower dB value per scale factor step, which equates to greater resolution.

Figure 2:
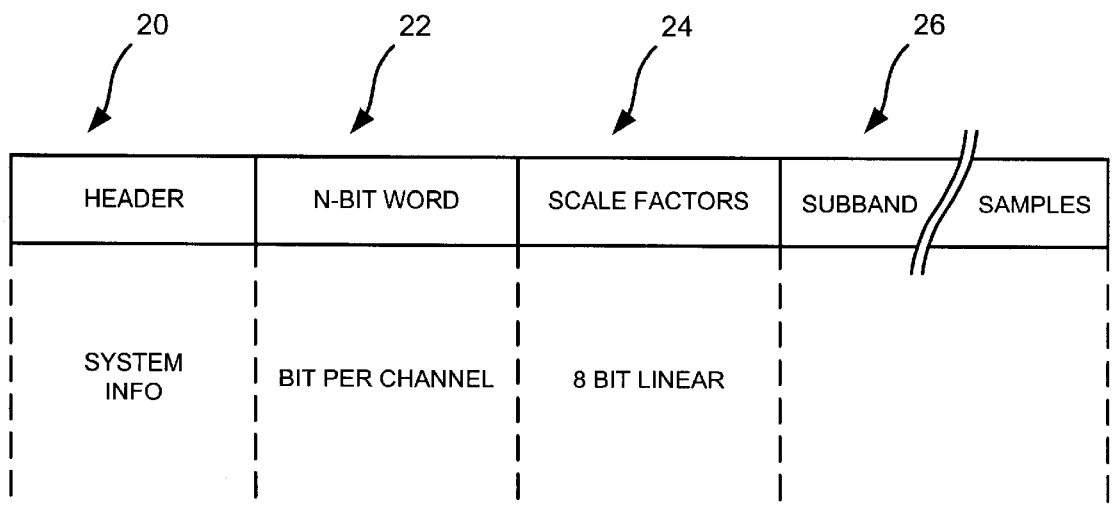
FIG. 2 is an exemplary encoding format for an audio frame according to the present invention.
Figure 3:
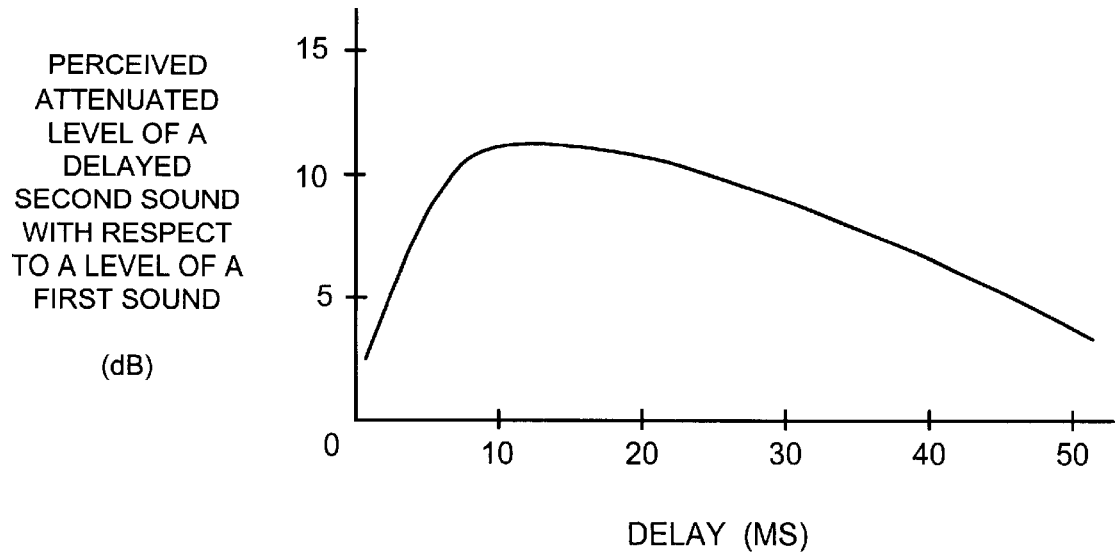
FIG. 3 is a Haas effect fusion zone curve for use with the present invention.

More specifically, referring now to FIG. 2, an exemplary encoding format for an audio frame is shown according to the present invention. As seen therein, a data format information header (20) is sent first. As in prior art perceptually encoded audio formats, the header (20) includes sync words, data formats, audio frame sample rate, channels; etc. However, also encoded in the header (20) is any subband transmitting order such as high frequency bands first, low frequency bands last or vice-versa. In that regard, sending high frequency bands first (e.g., subband 31, subband 30, etc.) could improve pseudo real time performance.

The amount of data bits allowed for each subband is preferably held static at 2 bits (indicating positive, zero, or negative) per sample; thereby reducing the data size to a minimum. Alternatively, the amount of data bits for each subband could be made compatible with generic MPEG systems, such as a constant 3 bits or 5 bits for each subband (similar to MPEG audio layer 2, index 1 or 2), or 7 bits for lower subbands such as 0, 1 and 2. The subband data may alternatively be composed of Fast Fourier Transform (FFT) or Modified Discrete Cosine Transform (MDCT) frequency and phase information. This is similar to MPEG layer 3, Dolby AC3 and other systems, with the exception that such systems include frequency, phase and amplitude information.

The audio frame sample rate stated in the header (20) should be in the range of 0.008 seconds per frame (which equals 384, 16 bit PCM samples at 48,000 samples per second, or about 353 samples per frame at compact disc PCM audio rate). This keeps pre-echo masked by using the largest frame size that can be hidden by the well known Haas effect fusion zone (also referred to in the literature as temporal masking or pre-echo effect) depicted in FIG. 3. This frame rate is the same as used by MPEG audio layer 1 and is the most easily edited MPEG format. For the most accurate fidelity and the most precise editing, the frame rate should be in the range of 0.004 seconds per audio frame (which is approximately 177 linear pcm samples at compact disc PCM audio rate). This ensures that any one audio frame can generate a temporal mask for the next audio frame, thereby guaranteeing a minimization of pre-echo effects. For editing compatibility, the audio frame sample rate should remain constant per audio file or transmission. However, adaptation to varying rates can be employed.

Scale factor resolution information (e.g., 2 dB, 1.5 dB, 1 dB, 0.5 dB per scale factor) should also be transmitted in the header (20). The present invention thereby provides scientific notation of audio, where audio subband data is used as the low resolution mantissa, the scale factors are used as the exponents, and synthesis filters smooth out all errors.

Still referring to FIG. 2, after the header (20), a 32-bit word (22) is sent indicating in total, each subband information that will follow, one bit for each channel. Such a word (22) can be used to calculate the length of data transmission. A low threshold can be set to eliminate very low level subband information considered unneeded by a program producer, or to cap a transmission/storage bit rate.

Thereafter, all active scale factors (24) are transmitted followed by all active subband data samples (26). Transmission of such scale factors (24) and subband data samples (26) is undertaken according to the specific sequence designated in the header (20) (e.g., subband 0, subband 1, subband 2, subband 3, subband 5, subband 8, subband 10, etc.). Similarly, the number of bits transmitted for each individual subband is according to the specific format designated in the header (20).

The bit rate of the data stream provided by the present invention may be either variable or fixed, depending upon implementation requirements In the variable mode the length of the data per frame of audio would be calculated by the preceding header information in order to anticipate the next sync word and/or frame header.

Figure 4:
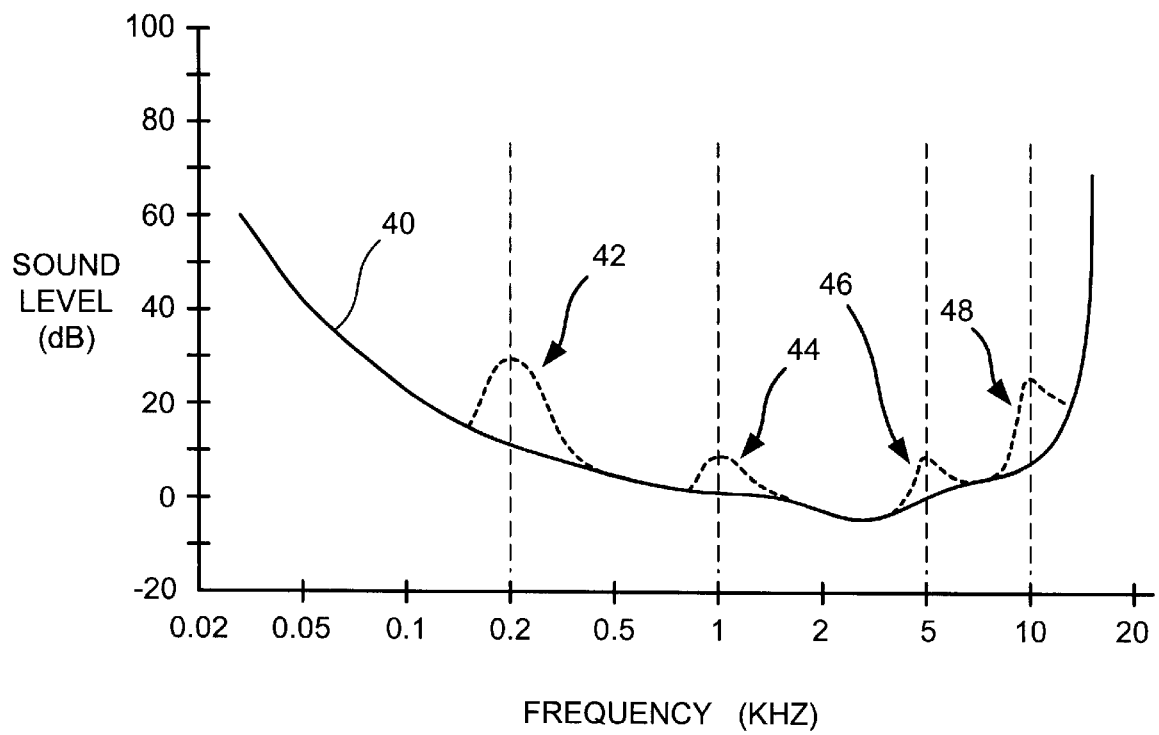
FIG. 4 is a psychoacoustic model of a human ear including exemplary masking effects for use with the present invention.

As previously discussed, prior art perceptually encoded audio systems eliminate portions of the audio that might not be perceived by an end user. This is accomplished using well known psychoacoustic modeling of the human ear. Referring now to FIG. 4, such a psychoacoustic model including exemplary masking effects is shown. As seen therein, at a given frequency (in kHz), sound levels (in dBs) below the base line curve (40) are inaudible. Using this information, prior art perceptually encoded audio systems eliminate data samples in those frequency subbands where the sound level is likely inaudible.

As also seen therein, short band noise (i.e., noise having a narrow bandwidth) centered at various frequencies (42, 44, 46, 48) modifies the base line curve (40) to create what are known as masking effects That is, such noise (42, 44, 46, 48) raises the level of sound required around such frequencies before that sound will be audible to the human ear. Using this information, prior art perceptually encoded audio systems further eliminate data samples in those frequency subbands where the sound level is likely inaudible due such masking effects.

According to the present invention, however, such masked subbands are retained rather than eliminated from the encoded audio, making the recording non-destructive and audiophile quality. As a result, the encoded audio is easy to process for equalization, mixing, etc. since all of the original audible information is retained at low distortion. Moreover, more accurate archiving is facilitated and the data occupies much less space than current compact disc data, with much less distortion.

As in the prior art, however, if no information is present to be encoded into a subband, the subband does not need to be transmitted. Moreover, if the subband data is well below the level of audibility (not considering masking effects), as shown by base line curve (40) of FIG. 4, the particular subband need not be encoded.

It should be noted that, for time amplitude data samples, the effective sample data rate is reduced as a function of the highest frequency in each subband of the signal according to the Nyquist theorem that the minimum sample rate is greater than double the highest frequency to be reproduced. This greatly reduces the data rate and/or size. The data samples are multiplied in quantity to reconstruct the original signal. Frequency transformed signals (e.g., MPEG layer 3, Dolby AC3, and others) are already minimized. Moreover, amplitude information is also eliminated from such subband data samples.

Very narrow band filters are provided for the reconstruction of the audio signal after all scale factors are applied to each subband. Such filters are preferably used to reduce the harmonic distortions caused by coarsely quantized audio to below any noise floor. In effect, this makes the subband filter incapable of producing anything but a very low distortion sinusoidal output.

For time amplitude data samples, further compression of data can be achieved by identifying physical data conditions that could be represented by smaller data sequences. These small data sequences can be used as "short-hand" representations of the larger data sequences (which larger data sequences may then be referred to as "hidden" in the smaller data sequence) in the normal datastream because such encodings cannot occur in the subband filtered data according to the bandwidth of the subband. As a result, the hidden data sequences can be readily identified and re-expanded back to the original data at the receiving end.

Such further data compression may be used with conventional "lossy" perceptually encoded audio systems, or with the audiophile quality encoding of the present invention If used with a lossy data compression scheme such as MPEG audio layer 1 or 2, no degradation of the signal will result. If used with audiophile quality subband encoding of the present invention, then a higher compression ratio is achieved, thereby making the possibility of audiophile quality data compression in the same data space as normal MPEG layer 1 or 2 audio.

Figure 5:
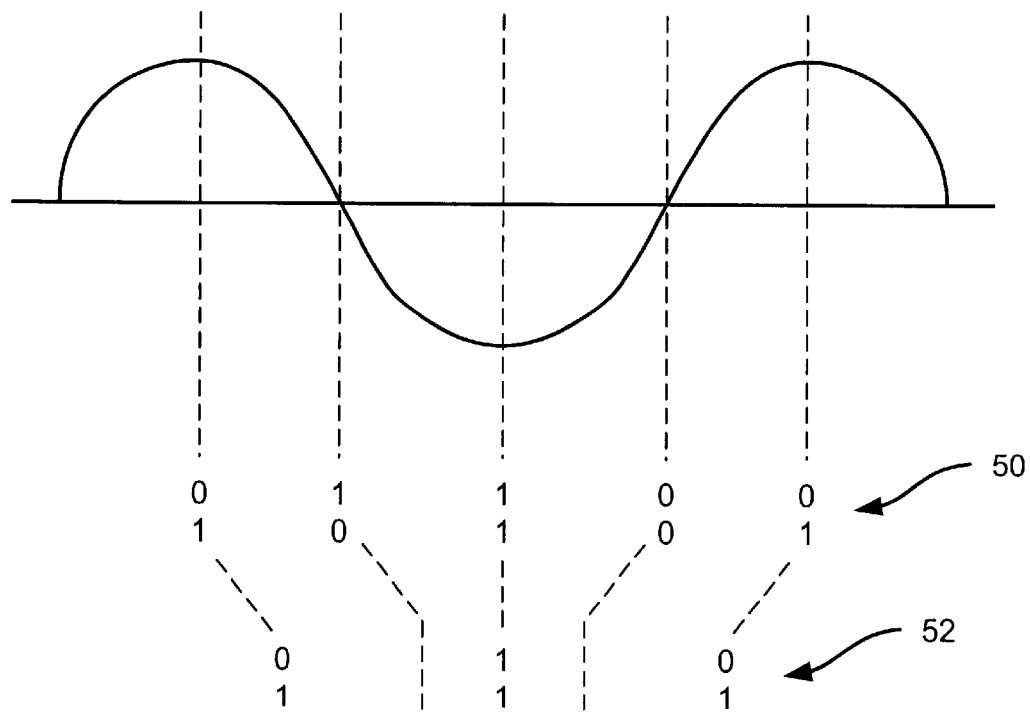
FIG. 5 is an exemplary sine wave and corresponding encoded bit sequences therefor according to the present invention.

In that regard, referring now to FIG. 5, an exemplary sine wave and corresponding encoded bit sequences therefor according to the present are shown. As seen therein, a normal bit sequence (50) of two-bit indicators corresponding to a sine wave across time in a data packet for a particular subband begins with 01, indicating a maximum positive polarity. The next two-bit word is 10, indicating a zero crossing. The next two-bit word is 11, indicating a maximum negative polarity. The next two-bit word is 00, indicating a zero crossing. The next two-bit word, 01, begins the sequence again.

For the further data compression discussed above, zero crossings can be assumed and eliminated from the encoded audio, and later re-inserted at the receiving end. The resulting compressed bit sequence (52) again begins with 01, indicating a maximum positive polarity. However, the next two-bit word is 11, indicating a maximum negative polarity. The next two-bit word, 01, begins the sequence again.

As is readily apparent, such a sequence represents transitions in the original data that cannot occur according to the bandwidth of the subband. Using this information, the two-bit words representing the zero crossings can be re-inserted into the sequence at appropriate locations to reconstruct the digital audio signal at the receiving end. It should be noted that this example depicts 2 to 1 compression. Similar compressions are available in the lower frequency and/or higher bit resolution subbands.

Figure 6:
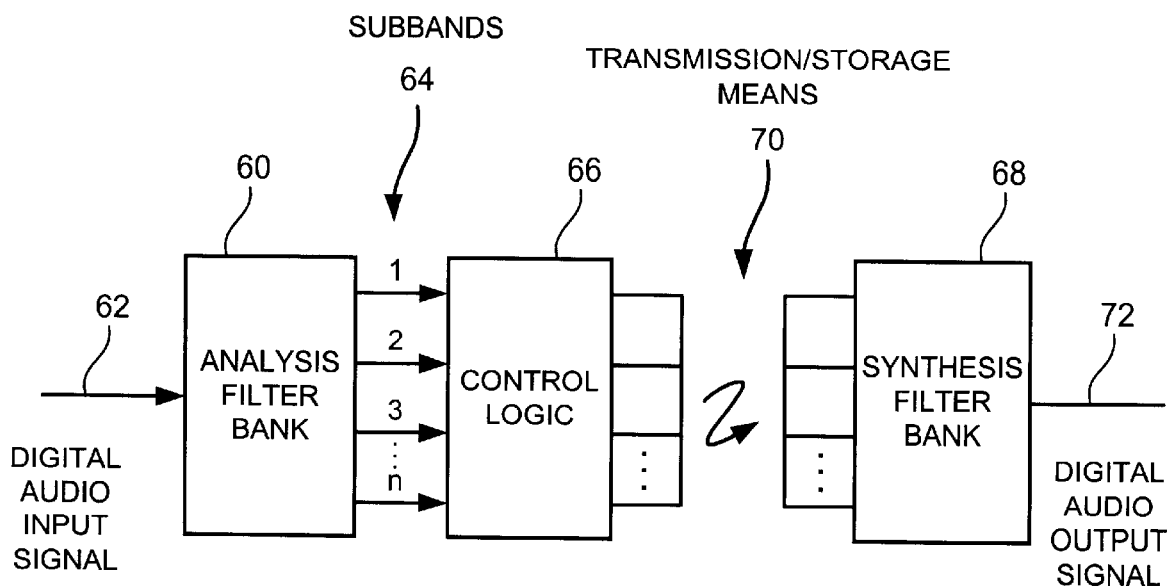
FIG. 6 is a simplified block diagram of the system of the present invention.

Referring finally to FIG. 6, a simplified block diagram of the system of the present invention is shown. As seen therein, the system comprises an analysis filter bank (60) for receiving a digital audio input signal (62). Analysis filter bank (60) also acts as a sampler for dividing the audio input (62) into a plurality of frames at a designated sample rate.

Still further, analysis filter bank (60) divides each frame into a plurality of subbands (64). While 32 equal width subbands are preferred (as used in MPEG layer 1 audio), any number of subbands having any types of widths may be used. In that regard, such subbands are preferably frequency subbands, and the division of each frame into such subbands may be accomplished using any well known form of spectral analysis such as fast Fourier transform (FFT) or modified discrete cosine transform (MDCT) operations.

The system of the present invention also comprises control logic (66), which is provided in communication with analysis filter bank (60). Control logic (66) is operative to perform the functions previously described concerning encoding. In that regard, control logic (66) is operative to assign each of the plurality of subbands an indicator selected from the group consisting of positive, zero, and negative, wherein the indicator selected is based on a polarity and a magnitude of the subband, assign each of the plurality of subbands one of a plurality of scale factor steps, wherein each scale factor step represents a sound level range of at most two decibels, and generate a digital word for each of the plurality of frames, each digital word having a scale factor section including the scale factor steps for the plurality of subbands in the frame, and a sample data section including the indicators for the plurality of subbands in the frame. Control logic (66) and analysis filter bank (60) together act as an encoder.

The system of the present invention still further comprises a synthesis filter bank (68), which is provided in communication with control logic (66) via any known means for data transmission or storage (70). In that regard, synthesis filter bank (68) acts as a decoder for reconstructing a digital audio output signal (72).

Figure 7:
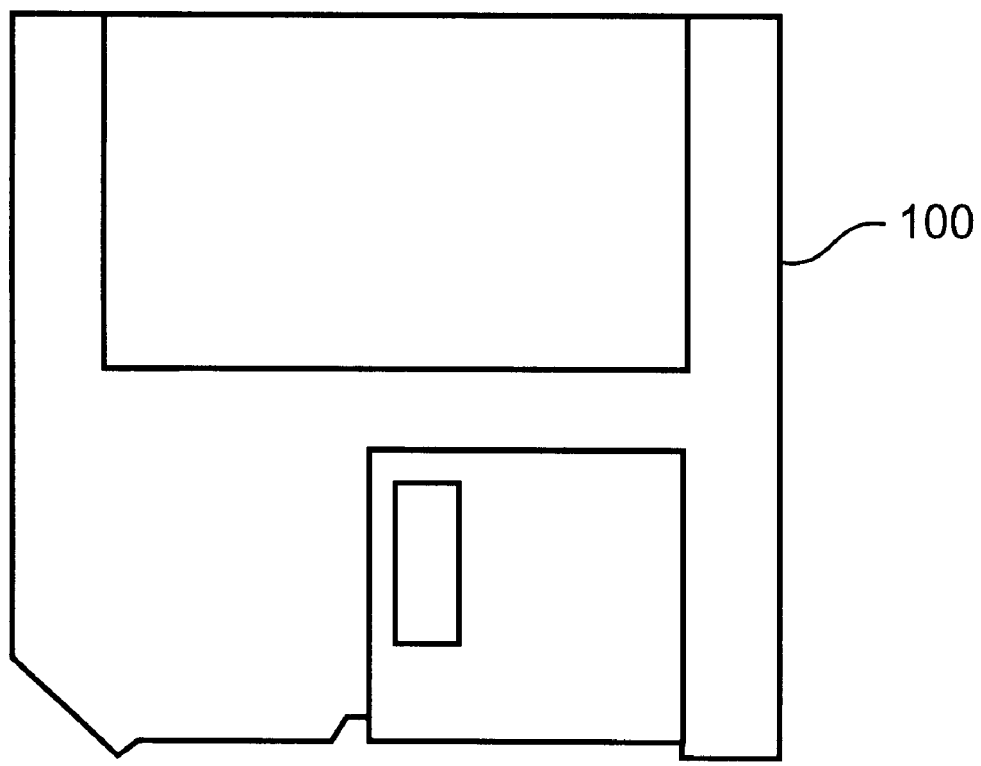
FIG. 7 is an exemplary storage medium for use with the product of the present invention.

Referring finally to FIG. 7, an exemplary storage medium (100) for the product of the present invention is shown. In that regard, storage medium (100) is depicted as a conventional floppy disk, although any other type of storage medium may also be used.

Storage medium (100) has recorded thereon computer readable programmed instructions for performing various functions of the present invention. More particularly, storage medium (100) includes instructions operative to assign each of a plurality of subbands in each of a plurality of frames of the digital audio signal an indicator selected from the group consisting of positive, zero, and negative, wherein the indicator selected is based on a polarity and a magnitude of the subband, assign each of the plurality of subbands one of a plurality of scale factor steps, wherein each scale factor step represents a sound level range of at most two decibels, and generate a digital word for each of the plurality of frames, each digital word having a scale factor section including the scale factor steps for the plurality of subbands in the frame, and a sample data section including the indicators for the plurality of subbands in the frame.

As previously stated, each indicator comprises a two bit word, the first bit representing the polarity and the second bit representing the magnitude of the subband. Moreover, the digital word generated for each of the plurality of frames may exclude each indicator having a two bit word with a zero magnitude. Further, the digital word generated for each of the plurality of frames may also include a subband information section indicating active subbands in the frame based on a psychoacoustic model. Still further, the digital word generated for each of the plurality of frames may also include a header section indicating a subband order.

The expansion of dynamic range and retention of all information provided by the present invention is advantageous in many respects. First, the distortion level could be very low (less than 0.0001% if needed) and constant, independent of level. Second, the expanded dynamic range allows recordings to be made with greater range than the human ear. Thus, the present invention provides a robust medium that can be processed (editing, equalized, effects, etc.) with full data integrity Moreover, the present invention provides much higher data density than conventional audio compact discs, with greater than an equivalent 26 bit linear resolution dynamic range and less relative distortion than a 26 bit linear system. That is, more assets may be stored in any given data space such as CD-ROM, or higher quality sound may be stored in the same amount of data space as normally used for lesser quality sound. The present invention also provides for very simple processing of audio as compared to conventional linear digital audio.

Still further, the greater compression of data according to the present invention makes high fidelity sound more compact for use in any type of Digital Signal Processor (DSP) application including audio/video post-production, computer systems, hearing aids, transmission across networks including cellular, wireless and cable telephony, faster downloads of audio program signals over the internet, cable television systems, satellites, etc. Moreover, for final delivery of this audio through narrow data channels, masking characteristics according to the well known psychoacoustic models previously discussed can be applied to easily remove unneeded subbands from the transmission system.

It should be noted that the present invention can stand alone with dedicated encoders and decoders or software, or can be used with other means for scaling existing perceptually encoded audio (e.g., the various layers of MPEG, Musicam, or other perceptually encoded systems) to standard of the present invention or vice versa. That is, conventional perceptually encoded audio systems can be adapted to and from the present invention for compatibility and further reduction in data rate.

It should still further be noted that the present invention can be used in conjunction with the inventions disclosed in U.S. patent application Ser. No. 08/771,462 entitled "Method, System And Product For Modifying The Dynamic Range Of Encoded Audio Signals"; U.S. patent application Ser. No. 08/771,792 entitled "Method, System And Product For Modifying Transmission And Playback Of Encoded Audio Data"; U.S. patent application Ser. No. 08/771,512 entitled "Method, System And Product For Harmonic Enhancement Of Encoded Audio Signals"; U.S. patent application Ser. No. 08/769,911 entitled "Method, System And Product For Multiband Compression Of Encoded Audio Signals";U.S. patent application Ser. No. 08/777,724 entitled "Method, System And Product For Mixing Of Encoded Audio Signals"; U.S. patent application Ser. No. 08/769,732 entitled "Method, System And Product For Using Encoded Audio Signals In A Speech Recognition System"; U.S. patent application Ser. No. 08/772,591 entitled "Method, System And Product For Synthesizing Sound Using Encoded Audio Signals"; U.S. patent application Ser. No. 08/769,731 entitled "Method, System And Product For Concatenation Of Sound And Voice Files Using Encoded Audio Data"; and U.S. patent application Ser. No. 08/771,469 entitled "Graphic Interface System And Product For Editing Encoded Audio Data", all of which were filed on the same date and assigned to the same assignee as the present application, and which are hereby incorporated by reference.

As is readily apparent from the foregoing description, then, the present invention provides an improved method, system and product for encoding of a digital signal representing an audible sound. More specifically, the present invention encodes digital audio signals in a fashion such that the signals are provided with an audiophile quality. Moreover, the present invention also encodes digital audio signals with an improved dynamic range.

It is to be understood that the present invention has been described in an illustrative manner and the terminology which has been used is intended to be in the nature of words of description rather than of limitation. As previously stated, many modifications and variations of the present invention are possible in light of the above teachings Therefore, it is also to be understood that, within the scope of the following claims, the invention may be practiced otherwise than as specifically described.

What is claimed is:

1. A method for subband encoding a digital audio signal comprising:
   dividing the digital signal into a plurality of frames;
   dividing each of the plurality of frames into a plurality of frequency subbands;
   assigning each of the plurality of subbands an indicator selected from the group consisting of positive, zero, and negative, wherein the indicator selected is based on a polarity and a magnitude of the subband and without regard to a psychoacoustic model, the indicator comprising a two bit word, one bit representing the polarity of the subband and one bit representing the magnitude of the subband;
   assigning each of the plurality of subbands one of a plurality of scale factors, each scale factor comprising an eight bit word having a resolution of one decibel per scale factor; and
   generating a digital word for the plurality of frames, the digital word having a scale factor section including the scale factors for the plurality of subbands in the plurality of frames, and a sample data section including the indicators for the plurality of subbands in the plurality of frames.

2. The method of claim 1 wherein the digital word generated for each of the plurality of frames excludes each indicator having a two bit word with a zero magnitude.

3. The method of claim 1 wherein the digital word generated for each of the plurality of frames further includes a subband information section indicating active subbands in the frame.

4. A system for subband encoding a digital audio signal comprising:
   a sampler for dividing the digital signal into a plurality of frames;
   a filter for dividing each of the plurality of frames into a plurality of frequency subbands; and
   control logic operative to assign each of the plurality of subbands an indicator selected from the group consisting of positive, zero, and negative, wherein the indicator selected is based on a polarity and a magnitude of the subband and without regard to a psychoacoustic model, the indicator comprising a two bit word, one bit representing the polarity of the subband and one bit representing the magnitude of the subband, assign each of the plurality of subbands one of a plurality of scale factors, each scale factor comprising an eight bit word having a resolution of one decibel per scale factor, and generate a digital word for the plurality of frames, the digital word having a scale factor section including the scale factors for the plurality of subbands in the plurality of frames, and a sample data section including the indicators for the plurality of subbands in the plurality of frames.

5. The system of claim 4 wherein the digital word generated for each of the plurality of frames excludes each indicator having a two bit word with a zero magnitude.

6. The system of claim 4 wherein the digital word generated for each of the plurality of frames further includes a subband information section indicating active subbands in the frame.

7. A product for subband encoding a digital audio signal comprising:
   a storage medium; and
   computer readable instructions recorded on the storage medium, the instructions operative to divide the digital signal into a plurality of frames, divide each of the plurality of frames into a plurality of frequency subbands, assign each of the plurality of subbands an indicator selected from the group consisting of positive, zero, and negative, wherein the indicator selected is based on a polarity and a magnitude of the subband and without regard to a psychoacoustic model, the indicator comprising a two bit word, one bit representing the polarity of the subband and one bit representing the magnitude of the subband, assign each of the plurality of subbands one of a plurality of scale factors, each scale factor comprising an eight bit word having a resolution of one decibel per scale factor, and generate a digital word for the plurality of frames, the digital word having a scale factor section including the scale factors for the plurality of subbands in the plurality of frames, and a sample data section including the indicators for the plurality of subbands in the plurality of frames.

8. The product of claim 7 wherein the digital word generated for each of the plurality of frames excludes each indicator having a two bit word with a zero magnitude.

9. The product of claim 7 wherein the digital word generated for each of the plurality of frames further includes a subband information section indicating active subbands in the frame.

* * * * *